July 11, 1950     R. W. BEYLAND     2,514,366
FILTER
Filed Sept. 19, 1945
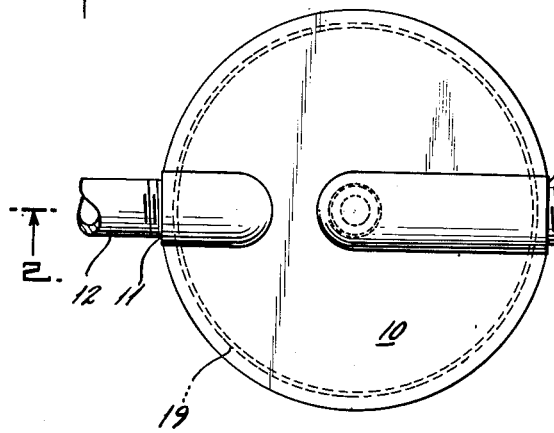
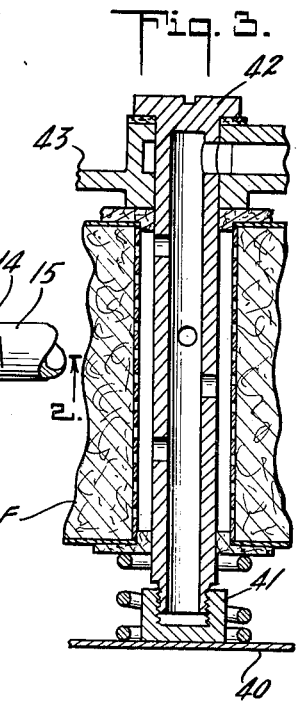
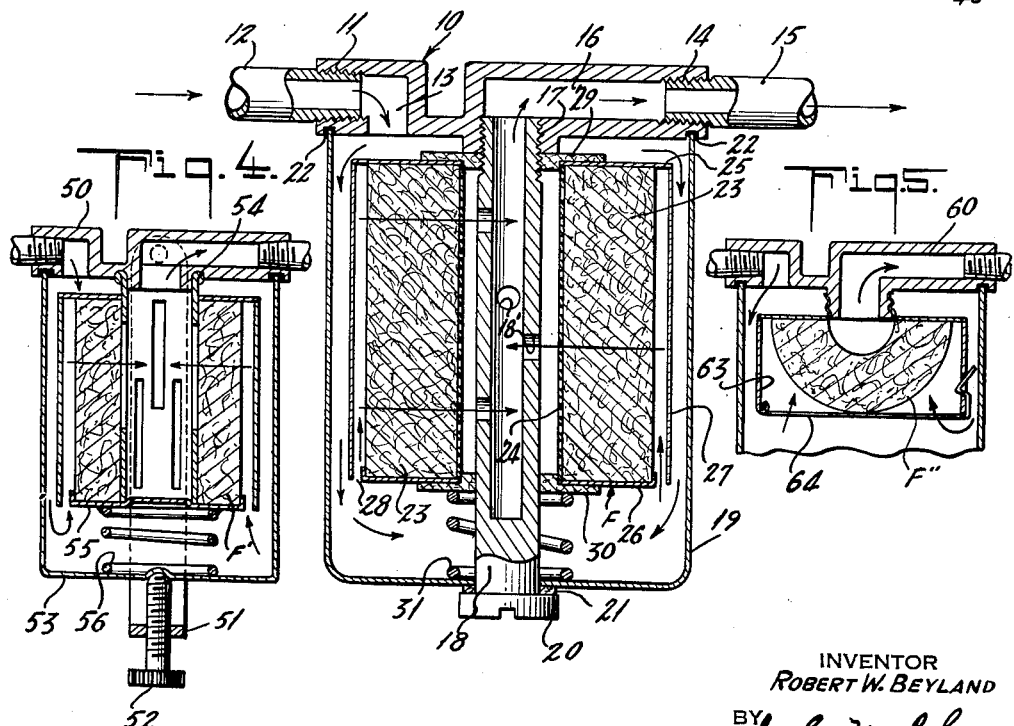
INVENTOR
ROBERT W. BEYLAND
BY John M. Cole
ATTORNEY Patented July 11, 1950

2,514,366

UNITED STATES PATENT OFFICE 2,514,366

FILTER

Robert W. Beyland, Little Silver, N. J.

Application September 19, 1945, Serial No. 617,227

2 Claims. (Cl. 210—112)

The present invention relates to filters for liquids such as gasoline, fuel oil and the like.

Petroleum products such as gasoline and fuel oil are likely to contain foreign particles, dirt and water, and the present invention contemplates filters suitable not only for mechanically removing the dirt and foreign particles, but also for reducing to a very substantial amount the water content of the fuel.

According to the present invention the filter element employed in the filter is made of cellulose sponge. I have discovered that this material operates very satisfactorily as a filter medium for preventing the passage of dirt and foreign particles and when previously wetted with the petroleum product, it has the property of holding back water.

In as much as the cellulose sponge when wetted by the gasoline or fuel oil has very little resistance to deformation by external forces, the present invention contemplates the employment of a cartridge arrangement to receive the cellulose sponge, guide the liquid to the exposed surface of the sponge and protect it against deformation by the means used to hold the filter cartridge in place.

In the preferred forms of construction the filter employs an upper plate adapted to be introduced in the piping system carrying the liquid, a removable can or cup carried below the top plate and adapted to form a closed filter chamber and a filter cartridge preferably of a generally cylindrical shape and arranged so that the liquid entering into the filter chamber from above is compelled to first go to the bottom of the chamber and then ascend along the outer surface of the filter element.

Other and further objects will hereinafter appear as the description proceeds.

The accompanying drawings show, for purposes of illustrating the present invention, four embodiments in which the invention may take form, it being understood that the drawings are illustrative of the invention rather than limiting the same.

In these drawings:

Figure 1 is a top plan view of a filter;

Figure 2 is a vertical sectional view on the line 2—2 of Figure 1;

Figures 3, 4 and 5 are vertical sectional views showing modified forms of construction.

In the form shown in Figures 1 and 2, a top 10 is provided with a threaded inlet opening 11 adapted to be connected to a supply pipe 12 and this inlet opening communicates with a downwardly opening passage 13. The plate 10 is also provided with a threaded opening 14 for connection with a delivery pipe 15. The outlet passageway 16 opens downwardly at the center of the plate and is tapped as indicated at 17. A central tubular member 18 is engageable with the threads 17, passes up through a cup-like member 19 and has a head 20 to hold this member in place. Gaskets 21 and 22 form liquid tight joints.

The filter element designated generally by the reference character F in Figure 2, employs a hollow, cylindrical filter element 23 made of cellulose sponge. This filter element is received in a casing made of thin sheet metal, this casing having an inner perforated tubular member 24, a top plate 25, a bottom plate 26 and an outer cylindrical element 27. The various parts going into the making of this casing may be held together by seamed joints similar to those used in making tin cans. The filter element is long enough to be held under slight compression between the bottom and top walls so that the passage of liquid across these walls is prevented.

The top element 25 and the outer element 27 of the casing will compel the liquid entering the chamber to pass down to the bottom of the chamber before it can go up through the gap 28 provided between the elements 26 and 27 of the casing. Then the liquid passes through the outer surface of the sponge, through the inner or discharge surface and the openings in the perforated tubular member 24 of the casing and then can pass through holes 18' in the tubular member 18 for discharge through the discharge opening. The filter element F is received between gaskets 29 and 30 and is held in place by compression spring 31.

In use, a filter of this type will separate dirt and foreign matter from the liquid being filtered and will also intercept water so that the discharged liquid will be free of dirt and foreign particles and practically water free. The dirt and water separated will collect in the cup.

In the form of construction illustrated in Figure 3, the filter element F is the same as before. The container 40 is provided with a threaded lug 41 to receive the lower end of the tubular member 42 which passes down through the top plate 43. The operation of the filter will be the same as before. In this form of construction the cup-like member 40 will be able to retain the liquid in it when it is released by unthreading the central tubular member.

In the form of construction illustrated in Figure 4, the top plate 50 carries a bail 51 with screw 52. This device is arranged so that the bail holds a cup-like member 53 in place. The filter cartridge F' is similar to the one above described except that it is arranged to have a telescoping connection at 54 with a downwardly extending boss carried by the top plate 50. The bottom plate 55 extends completely across the bottom of the filter element so as to close off the bottom of the filter cartridge. A spring 56 will hold the cartridge in place. This device operates essentially the same as those previously described.

In the modification shown in Figure 5, the top plate 60 threadedly carries the casing 63 of a filter cartridge F''. This filter element is indicated as being hemispherical and is held in place by a hinged strap 64.

Since it is obvious that the invention may be embodied in other forms and constructions within the scope of the claims, I wish it to be understood that the particular forms shown are but a few of these forms, and various modifications and changes being possible, I do not otherwise limit myself in any way with respect thereto.

What is claimed is:

1. In a filter for gasoline fuel oil and the like immiscible with water, a cellulose sponge filter element in the form of an annulus having outer and inner walls cylindrical about a vertical axis and flat parallel ends, a filter element container having an upper flat plate larger in diameter than the annulus, and carrying a depending skirt spaced from the outer wall of the annulus, a bottom plate fitted across the bottom of the annulus and having narrow flanges to fit about the lower portions of its outer walls, and an inner tubular perforated element interconnecting the top and bottom plates to prevent distortion of the filter element.

2. In a filter for liquids such as gasoline, fuel oil and the like immiscible with water, a closed container having an upper part with a downwardly opening inlet passage and a downwardly opening outlet passage, a lower cup-like part, and means to hold the two parts together to form a filter chamber, and a filter cartridge secured in the filter chamber in a position to intercept liquids passing from the inlet passage to the outlet passage, the cartridge having a hollow, tubular, vertically extending cylindrical filtering element composed of cellulose sponge, and a sponge receiving casing having a perforated tube fitting the inner surface of the filtering element and communicating with the discharge passage and top and bottom members fitting the upper and lower ends of said element to provide physical support therefor and prevent deformation, the outer surface of the sponge being submerged in the liquid in the container, the casing having a cylindrical wall extending downwardly from the periphery of the upper end thereof and spaced from the outer surface of the filtering element to compel the liquid to flow downwardly and provide a passage through which the liquid flows upwardly to reach the outer surface of the filtering element.

ROBERT W. BEYLAND.

REFERENCES CITED

The following references are of record in the file of this patent:

UNITED STATES PATENTS

| Number | Name | Date |
|---|---|---|
| 888,259 | Pauthonier | May 10, 1908 |
| 1,468,906 | Inman | Sept. 25, 1923 |
| 1,705,019 | Jones | Mar. 12, 1929 |
| 2,057,932 | Bolser | Oct. 20, 1936 |
| 2,141,903 | Brundage | Dec. 27, 1938 |
| 2,279,699 | White | Apr. 14, 1942 |
| 2,295,823 | Banigan et al. | Sept. 15, 1942 |
| 2,358,748 | Thompson | Sept. 19, 1944 |
| 2,372,669 | Haney et al. | Apr. 3, 1945 |
| 2,374,755 | Kisch | May 1, 1945 |
| 2,378,879 | Zylstra | June 19, 1945 |